Aug. 17, 1965  I. S. DE WOSKIN  3,201,295
METHOD OF AND APPARATUS FOR MANUFACTURING ABSORBENT PADS
Original Filed Aug. 10, 1959  6 Sheets-Sheet 1

Aug. 17, 1965    I. S. DE WOSKIN    3,201,295
METHOD OF AND APPARATUS FOR MANUFACTURING ABSORBENT PADS
Original Filed Aug. 10, 1959    6 Sheets-Sheet 3

Aug. 17, 1965  I. S. DE WOSKIN  3,201,295
METHOD OF AND APPARATUS FOR MANUFACTURING ABSORBENT PADS
Original Filed Aug. 10, 1959  6 Sheets-Sheet 4

Irvin S. De Woskin,
Inventor.
Koenig, Pope, Senniger and Powers,
Attorneys.

Aug. 17, 1965   I. S. DE WOSKIN   3,201,295
METHOD OF AND APPARATUS FOR MANUFACTURING ABSORBENT PADS
Original Filed Aug. 10, 1959   6 Sheets-Sheet 5

United States Patent Office 3,201,295
Patented Aug. 17, 1965

3,201,295
METHOD OF AND APPARATUS FOR MANUFACTURING ABSORBENT PADS
Irvin S. De Woskin, 1000 Washington Ave.,
St. Louis 1, Mo.
Original application Aug. 10, 1959, Ser. No. 832,509, now Patent No. 3,085,575, dated Apr. 16, 1963. Divided and this application July 20, 1962, Ser. No. 211,318
20 Claims. (Cl. 156—62.6)

This invention relates to methods of and apparatus for manufacturing absorbent pads, and more particularly to methods of and apparatus for manufacturing sanitary napkins.

This application is a division of my copending application Serial No. 832,509, filed August 10, 1959, entitled Absorbent Pads, issued as U.S. Patent 3,085,575, April 16, 1963.

The invention involves methods and apparatus for manufacturing sanitary napkins which represent an improvement over a prior type of sanitary napkin comprising a central layer of fluid-repellent character, which may be referred to as a barrier layer, fluff layers on opposite faces of the center layer, and a wrapper. In this prior type of napkin as marketed, the central barrier layer extends the full width of the napkin. Accordingly, only one of the fluff layers (the fluff layer which is worn toward the user's body) is useful for absorbing fluid discharge. The other fluff layer (the fluff layer away from the body), being completely blocked off by the barrier layer, is practically useless for the purpose of absorbing fluid discharge since when the first-mentioned fluff layer is saturated, the napkin as a practical matter is incapable of absorbing any additional fluid. Thus, on heavy discharge, the prior napkin cannot fulfill its purpose of protecting the user.

Among the several objects of this invention may be noted the provision of methods of and apparatus for economically manufacturing in quantity production an improved napkin construction which, while including a central barrier layer adapted to prevent fluid from striking through from the fluff on the inside of the napkin to the fluff on the outside of the napkin for normal discharge, is adapted to allow fluid to diffuse from the fluff on the inside to the fluff on the outside without having to strike through the barrier layer, thereby to provide a safety factor to protect the user in case of heavy fluid discharge; and the provision of methods for manufacturing such improved pads or napkins in a continuous straight-line process; and the provision of apparatus for carrying out manufacture in a continuous straight-line process. Other objects and features will be in part apparent and in part pointed out hereinafter.

The invention accordingly comprises the constructions and methods hereinafter described, the scope of the invention being indicated in the following claims.

In the accompanying drawings, in which several of various possible embodiments of the invention are illustrated, FIGS. 1, 1A and 1B (on sheets 1, 2 and 3 of the drawings, respectively) are semidiagrammatic side elevations illustrating a method and apparatus of this invention for making napkins with button-headed ends, FIG. 1A being a continuation of FIG. 1, and FIG. 1B being a continuation of FIG. 1A;

FIG. 3 is an enlarged vertical transverse section taken on line 3—3 of FIG. 1;

FIGS. 4 and 5 are enlarged vertical transverse sections taken on lines 4—4 and 5—5, respectively, of FIG. 1A;

Corresponding reference characters indicate corresponding parts throughout the several views of the drawings.

Figures 1, 3:
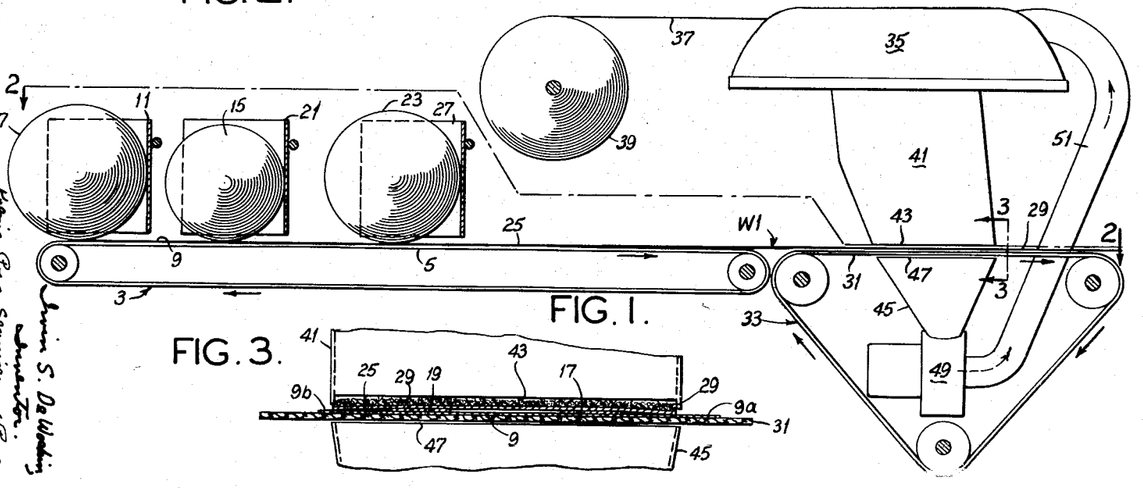
Figures 1A, 4, 5:
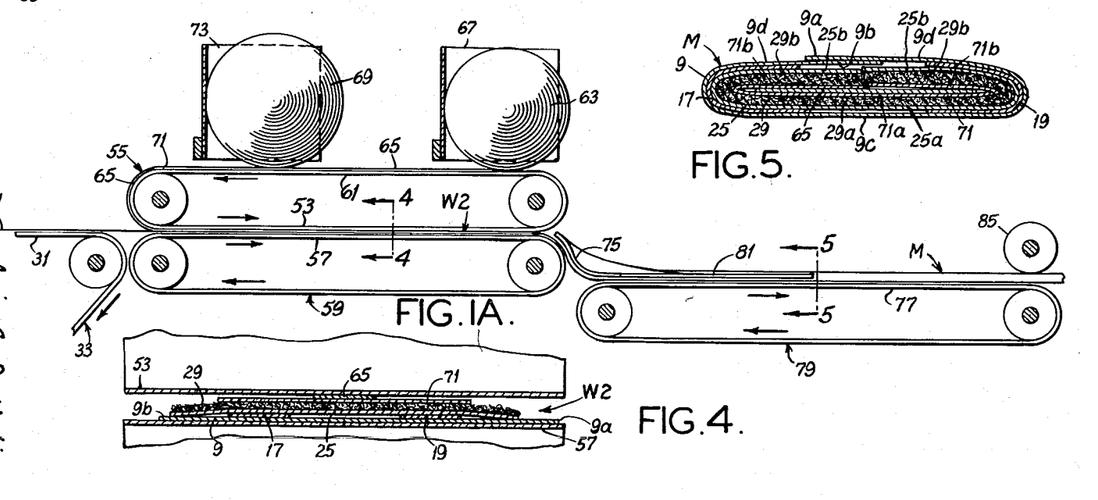
Figure 2:
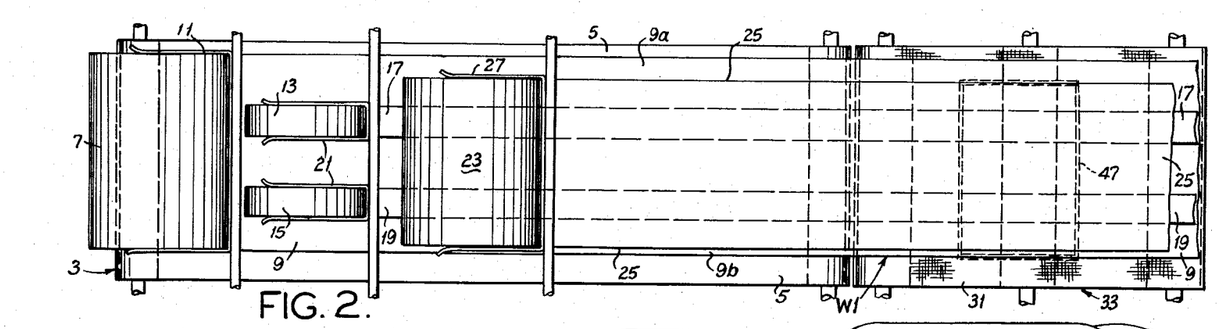
FIG. 2 is a plan view of FIG. 1, with certain parts omitted, taken essentially on line 2—2 of FIG. 1.

Referring to FIGS. 1–7 of the drawings, illustrating the manufacture of sanitary napkins of this invention with button-headed ends, there is indicated at 3 in FIGS. 1 and 2 an endless belt conveyor having a horizontal upper reach 5. Resting on the upper reach 5 adjacent its rearward or trailing end is a roll 7 of porous napkin-wrapper material, such as a web of nonwoven fabric of a type conventionally used in the manufacture of sanitary napkins. This web, which is designated 9, may be about eight inches wide, for example. The roll 7 rests on reach 5, being confined against forward and lateral movement as by means of a cage 11. The belt conveyor 3 is continuously driven for forward movement of its upper reach 5 as indicated by the arrows in FIG. 1, and this rotates the roll 7 to unwind the web 9 therefrom and feed it forward on upper reach 5 at the speed of the latter.

Forward of the roll 7 of wrapper material, two rolls 13 and 15 of narrow fluid-repellent strip material rest on the wrapper web 9. Each of the two strips, designated 17 and 19, may be a two-ply fluid-repellent tissue strip of a type conventionally used in the manufacture of sanitary napkins. Strips 17 and 19 are side strips. Each may be about one and one-quarter inches wide, for example. Each roll 13 and 15 is confined as by means of a cage 21, the cages being spaced on opposite sides of the longitudinal center line of the wrapper web 9. Forward movement of the upper reach 5 of belt conveyor 3 and the wrapper web 9 results in rotation of rolls 13 and 15 to unwind the two-ply side strips 17 and 19 and feed them forward along with web 9 on top of the latter. The rolls 13 and 15 are laterally spaced a distance such that the longitudinal center lines of side strips 17 and 19 as laid on web 9 are spaced apart about three and three-eighths inches.

Forward of the rolls 13 and 15, a roll 23 of absorbent material, such as a web of single-ply porous absorbent tissue of a type conventionally used in the manufacture of sanitary napkins, rests on the side strips 17 and 19. This web, which is designated 25, may be about seven inches wide, for example. The roll 23 is confined as by means of a cage 27. Forward movement of the upper reach 5 of belt conveyor 3, the wrapper web 9 and strips 17 and 19 results in rotation of roll 23 to unwind web 25 and feed is forward along with web 9 and side strips 17 and 19 on top of the strips. Web 25 is generally centered with respect to strips 17 and 19 but its longitudinal center line is somewhat offset from the longitudinal center line of web 9.

Thus, on the upper reach 5 of belt 3, there is formed a composite web W1, consisting of porous wrapper web 9, fluid-repellent tissue strips 17 and 19, and absorbent tissue web 25, with strips 17 and 19 sandwiched between webs 9 and 25, and with web 9 on the bottom and web 25 on top. Strips 17 and 19 are located approximately equal distances on opposite sides of the longitudinal center line of web 25, but the longitudinal center line of web 25 is somewhat laterally offset as regards the longitudinal center line of web 9. Thus, for example, one edge of web 25 may be about one-quarter inch in from the adjacent edge of web 9, and the other edge of web 25 may be about three-quarters inch in from the other edge of web 9. This is to provide the appropriate marginal overlap for wrapper web 9, as will be made clear.

The stated composite web W1 feeds forward continuously off the forward (leading) end of the upper reach 5 of belt conveyor 3, and a layer of fluff 29 (best shown in FIG. 3) is deposited on the web 25. This layer of fluff has a thickness of about one-quarter inch, for example, and its width is about the same as the width of web 25 (less than the width of web 9). The side margins of web 9 which extend laterally outward beyond the side edges of web 25 and fluff layer 29 are designated 9a, 9b, 9a being the three-quarter inch margin and 9b being the one-quarter inch margin. As shown in FIGS. 1 and 3, the layer of fluff 29 may be deposited on composite web W1 by feeding web W1 forward on the upper horizontal reach 31 of an endless screen belt conveyor 33. Reach 31 of conveyor 33 is generally horizontally coplanar with upper reach 5 of belt 3. Mounted above the belt conveyor 33 is a grinding mill 35, which serves as means for comminuting a web 37 of fibrous pulp material into loose fibers. Web 37, which resembles blotter paper, is fed to the mill from a roll 39. In the mill 35, the web of pulp material is comminuted into loose fibers. A duct 41 extends down from the mill and has an open lower end 43 immediately above the web 25 on upper reach 31 of screen belt 33. The width of duct 41 at its lower end corresponds to the width of web 25. Below the upper reach 31 of screen belt 33 is a duct 45 having an open upper end 47 immediately below the open lower end of duct 41. The upper reach 31 of screen belt 33, with composite web W1 thereon, travels between the open lower end 43 of duct 41 and the open upper end 47 of duct 45. Duct 45 is connected to the inlet of the centrifugal blower 49. A return duct 51 connects the outlet of the blower to the mill 35. The arrangement is such that air is drawn down through duct 41 from the mill 35, carrying with it the pulp fibers into which the web 37 is shredded in the mill, and these fibers are deposited on composite web W1 to form layer 29 thereon. The composite web W1 is porous and belt 33 is formed of screen material so that air may be drawn down into the lower duct 45, leaving the fibers behind on composite web W1. The forward side of the lower end of the upper duct 41 is cut away to allow for exit of fluff layer 29 on composite web W1.

Figure 2A:
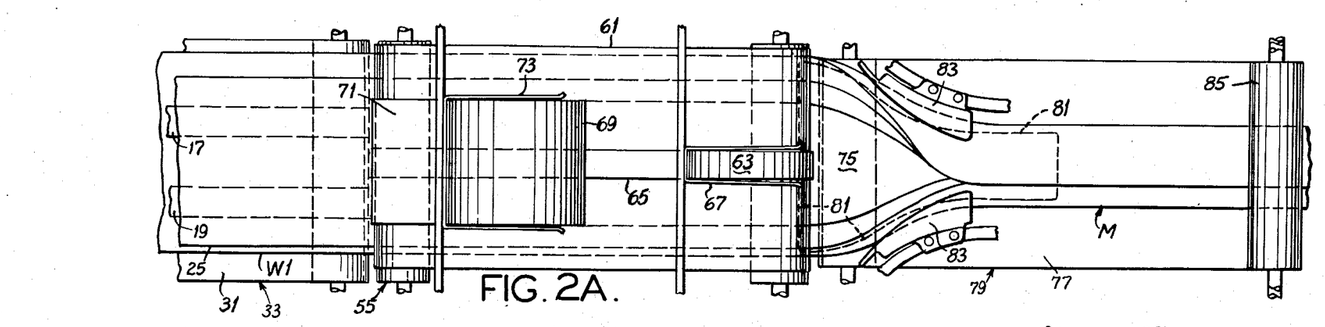
FIG. 2A is a plan view of FIG. 1A.

The composite web W1 with fluff layer 29 thereon feeds forward off the upper reach 31 of screen belt conveyor 33 between the lower horizontal reach 53 of an upper endless belt conveyor 55 and the upper horizontal reach 57 of a lower endless belt conveyor 59 (see FIGS. 1A and 2A). These belt conveyors are continuously driven for continuous forward movement of reaches 53 and 57. The upper belt conveyor 55 has a horizontal upper reach 61. A roll 63 of fluid-repellent strip material rests on the upper reach 61 of upper belt conveyor 55 adjacent the forward end of conveyor 55 (which is the trailing end of the upper reach 61). This strip, designated 65, may be a two-ply fluid-repellent tissue strip, the same type of material as side strips 17 and 19, for example. Roll 63 is confined as by means of a cage 67. Rearward movement of the upper reach 61 of the upper belt conveyor 55 results in rotation of roll 63 to unwind strip 65 and feed it rearward along with reach 61. A roll 69 of absorbent strip material rests on strip 65 rearward of roll 63. This absorbent strip, designated 71, may be a three-ply absorbent tissue strip, the same type of material as web 25, for example. Roll 69 is confined by a cage 73. Strip 71 unwinds from roll 69 on strip 65. Strip 71 is wider than strip 65 and these strips are generally longitudinally centered with respect to web 25. Strip 65 may be about two and one-half inches wide and strip 71 may be about five and one-quarter inches wide, for example. Strips 65 and 71 feed down and around the rearward end of the upper belt conveyor 55, and thence on top of the fluff layer 29 of composite web W1 and combine therewith to form a composite web W2 comprising bottom layer 9, fluid-repellent side strips 17 and 19, absorbent tissue web 25, fluff layer 29, absorbent web 71 on top of the fluff layer, and fluid-repellent strip 65 on top of the web 71.

Composite web W2 issuing from between belts 55 and 59 is fed downward under an arcuate folding horn 75 and onto the upper horizontal reach 77 of an endless belt conveyor 79. Horn 75 is of tapering form with a narrow flat forward extension 81 extending horizontally above the upper reach 77 of belt 79. This extension is of uniform width corresponding to the lateral spacing of the longitudinal center lines of the fluid-repellent side strips 17 and 19. As the composite web W2 travels forward under the horn 75 and the flat forward extension 81, folding means such as indicated at 83 acts to fold the side portions of web W2 which lie outward of the side edges of extension 81 over on top of extension 81. As these portions are folded over, side marginal portion 9a of web 9 overlaps side marginal portion 9b of web 9 (see FIG. 5). At this point, a colored string (not shown) may be fed in between the margins 9a and 9b to extend longitudinally thereof, if desired, to enable ready identification of one side of the napkins from the other and/or to add tensile strength in longitudinal direction of the napkins.

As a result of the above-described folding operation, the relatively wide flat composite web W2 is converted into continuous pad material M (see FIGS. 2A and 5) half the width of web 25 and fluff layer 29 and twice the original thickness of web W2, and comprising a flat unfolded central layer of fluid-repellent tissue 65, a layer of absorbent tissue 71 surrounding the central fluid-repellent layer having bottom portion 71a underlying the central layer 65 and portions 71b folded around the side edges of the central layer 65 and overlying the top of central layer 65, fluff layer 29 surrounding the layer 71 having flat bottom portion 29a underlying bottom portion 71a of layer 71 and portions 29b folded around the side edges of the layer 71 and overlying the top of layer 71, a layer 25 of absorbent tissue surrounding the fluff layer having bottom portion 25a underlying the fluff layer and portions 25b overlying the top of the fluff layer, fluid-repellent side strips 17 and 19 overlying layer 25 at the sides of material M, and outer wrapper 9 having bottom portion 9c underlying bottom portion 25a of layer 25 and portions 9d overlying layer 25.

Figure 1B:
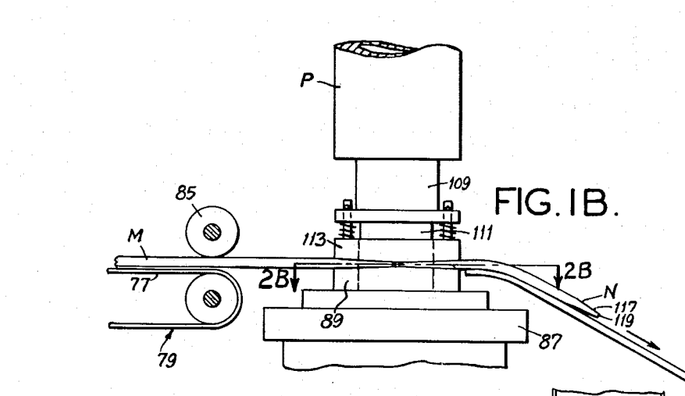
Figure 2B:
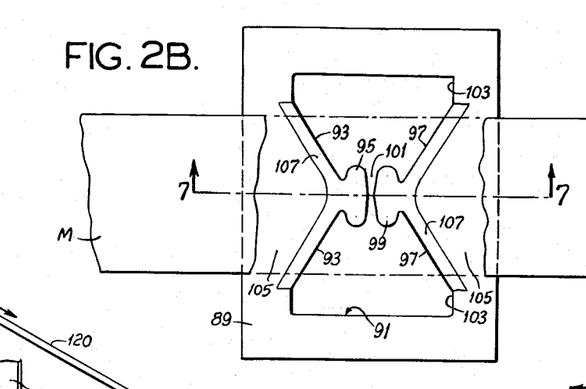
FIG. 2B is an enlarged view taken essentially on line 2B—2B of FIG. 1B, with parts broken away.
Figure 6:
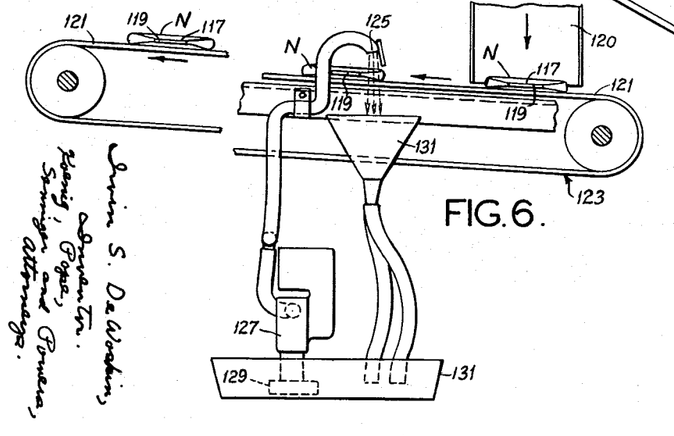
FIG. 6 is a view in elevation of part of FIG. 1B as viewed on line 6—6 of FIG. 1B, with parts broken away to reduce the width of the view.

At the forward end of belt conveyor 79 is a feed roll 85 which cooperates with the conveyor 79 to feed the continuous pad material M continuously through a punch press P (see FIG. 1B). This press includes a bed 87 on which is mounted a female die 89 (see FIGS. 2B and 7) having an opening 91 (see FIG. 2B) which is so shaped that the die has a forwardly extending triangular portion 93 with a crosshead 95 at the forward apex of the triangular portion 93 and a rearwardly extending triangular portion 97 with a crosshead 99 at the rearward apex of triangular portion 97. The crossheads are separated by a narrow neck portion 101 of opening 91 which leads into enlarged end portions 103 of the opening. The die 89 is positioned with the plane through the apices of triangular portions 93 and 97 coincident with the central vertical plane of the pad material M. The triangular portions are beveled as indicated at 105 in FIG. 7 so as to provide raised flat marginal portions 107 along the convergent sides of the triangular portions 93 and 97. The plunger 109 of the press carries a male die 111 having a shape corresponding to that of the opening 91 adapted to cooperate shearwise with the female die 89 to shear the pad material M which overlies the female die. Associated with the male die is a spring-backed presser plate 113 adapted, on a downstroke of the press plunger, to compress portions of the pad material M against the raised flat margins 107 of triangular portions 93 and 97 of the female die, after which the male die travels on down through the pressure plate and into opening 91 to shear the compressed portions of the pad material. Electrical resistance heaters such as indicated at 115 are provided for heating the dies.

Figure 7:
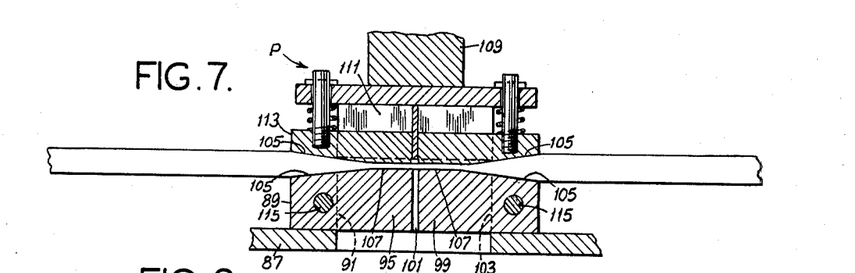
FIG. 7 is a vertical section taken on line 7—7 of FIG. 2B.

The pad material M is fed continuously through the press P, i.e., between the upper male die 111 and the lower female die 89. The press is intermittently operated at intervals corresponding to the desired napkin length to segment the pad material M into individual napkins N (see FIG. 8) each having compressed flat convergent end margins 117 with compressed flat buttonheads 119 at the apices of these convergent end margins. Each time the plunger of the press comes down, the presser plate 113 and male die 111 compress the portion of the pad material M extending from the rearward raised flat margin or ridge 107 to the forward raised flat margin or ridge 107 as shown in FIG. 7, and then the male die 111 drives on down into the opening 91 of the female die 89 to cut through the compressed portion of the pad material to form the trailing end of one napkin N and the leading end of the next napkin. The compressed portion of the pad material is sheared by the male die along the forward and rearward sides of the female die opening 91 to form the convergent end margins 117 and the buttonheads 119. The compressed portions of the pad tend to remain compressed, due to inherent moisture in the pad material and the action of the hot dies thereon. In some instances, the fluid-repellent strips 17, 19 and 65 which are made with a thermoplastic fluid-repellent agent may be used, this being activated by the hot dies to serve as a binder tending to hold fluff 29 compressed.

The individual napkins N die-cut from pad material M in the punch press P feed forward down a chute 120 onto the trailing end of the inclined upper reach 121 of a belt conveyor 123 (see FIGS. 1B and 6) which extends transversely with respect to the line of conveyor 79 upward from the exit side of the punch press. The napkins are carried away on the upper reach 121 and drop off its leading end into a container (not shown). The width of the belt 123 is less than the length of the napkins, consequently the end portions of the napkins extend laterally beyond the sides of the upper reach of the belt. As the napkins are carried along by belt 123, their ends are carried under nozzles 125 through which a solution or emulsion of a waterproofing and stiffening agent A, such as a solution of polyvinyl chloride in a volatile solvent, is delivered to impregnate the ends. The liquid is continuously pumped to the nozzles by a pump 127 having an inlet in a pan 129 below the nozzles. Excess liquid is collected in funnels 131 and returned to the pan, and recirculated back to the nozzles. The liquid flows down from nozzles onto the seamed side of the napkin ends. When it dries, it maintains the ends of the napkins compressed.

Figure 8:
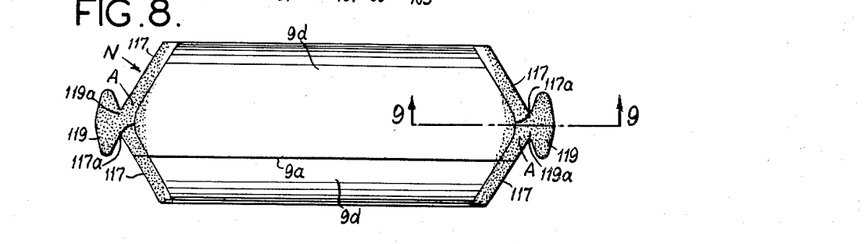
FIG. 8 is a plan view of a completed napkin with button-headed ends.
Figure 9:
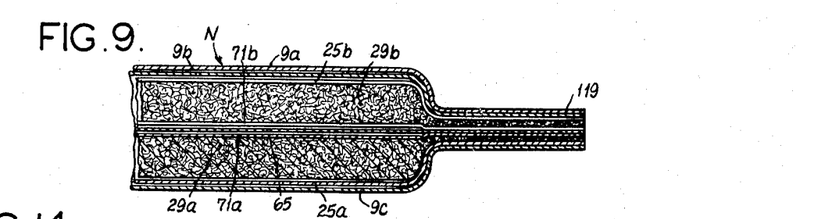
FIG. 9 is an enlarged longitudinal cross section of the FIG. 8 napkin taken on line 9—9 of FIG. 8.

A completed napkin N is illustrated in FIGS. 8 and 9. The transverse cross section of the napkin on any transverse plane between its ends is the same as appears in FIG. 5. From these illustrations, it will be apparent that the napkin comprises the central barrier layer 65 consisting of a strip of fluid-repellent tissue, which may be two-ply tissue. Surrounding the barrier layer 65 is the absorbent tissue strip 71 (which may be a three-ply strip) having flat portion 71a engaging one face of barrier layer 65 (its bottom face as appears in FIG. 5) and marginal portions 71b folded around the side edges of the barrier layer and engaging the other face of the barrier layer. Portions 71b are generally one-half the width of the barrier layer and the side edges of strip 71 are contiguous substantially along the longitudinal center line of the napkin. Surrounding the strip 71 is the layer or body of fluff 29, having flat portion 29a engaging the flat portion 71a of strip 71 and marginal portions 29b folded around with and engaging the marginal portions 71b of strip 71. The side edges of the fluff layer 29 are contiguous substantially along the longitudinal center line of the napkin. Surrounding the body of fluff is the absorbent tissue strip 25 (which may be single-ply strip) constituting an inner wrap, having flat portion 25a engaging flat portion 29a of the fluff body and marginal portions 25b folded around with and engaging marginal portions 29b of the fluff body. At the sides are the fluid-repellent tissue strips 17 and 19 (each of which may be a two-ply strip). Surrounding these side strips and the inner wrap 25 is the outer wrap 9, which may consist of nonwoven porous fabric, having flat portion 9c on flat portion 25a of the inner wrap 25 and marginal portions 9d folded around with marginal portions 25b of the inner wrap 25. These marginal portions 9d overlap at 9a and 9b.

As appears in FIGS. 8 and 9, the napkin N has at each end the compressed angled end margins 117 which converge to an apex 117a, and a compressed flat button head 119 at the apex. In effect, the head 119 is at the end of an integral stem 119a which is narrower than the width of the napkin. Head 119 on the end of the stem is wider than the stem but narrower than the width of the napkin. The stems and heads each include portions of the fluff body 29, the wrapper 9 and the other strips in the napkin, which portions are continuous with the main body of the napkin, and the end regions 117, the stems and the heads are compressed flatwise to be of less thickness and stiffer than the main body of the napkin, being held compressed and stiffened by the impregnating agent A.

The napkin N will usually be worn with portion 9c of the outer wrap 9 toward the body. Fluid is adapted to penetrate the outer wrap and the inner wrap and be absorbed by portion 29a of the fluff body 29 between the edges of the fluid-repellent side strips 17 and 19. Under ordinary circumstances, the fluid-repellent central barrier layer 65 will prevent fluid from striking through to the outside. On heavy fluid discharge, the fluid spreads out laterally in portion 29a and, if excessive, can penetrate around the side portions of the fluff body to the portions 29b of the fluff body on the outside.

FIGS. 10–14 illustrate the manufacture of sanitary napkins of this invention with outer wrapper extensions, instead of button-headed ends. The method is similar to the method of manufacturing the button-headed napkins N above described up to the punch press P, with the exception that roll 7 of the outer wrap material is left off the upper reach 5 of belt conveyor 3, and side strips 17 and 19 are fed onto the web 25 instead of underneath the web 25. For the latter purpose, roll 23 is positioned rearward of rolls 13 and 15, as appears in FIGS. 10 and 11, instead of forward of rolls 13 and 15, as in FIG. 1. With roll 7 omitted, only web 25 with side strips 17 and 19 thereon feeds under the lower end of the duct 41. As before, a layer of fluff 29 is deposited on the web 25, overlying the strips 17 and 19 on web 25 (see FIG. 12).

Web 25 with strips 17 and 19 and fluff layer 29 thereon feeds forward off the upper reach 31 of screen belt conveyor 33 between reaches 53 and 57 of belt conveyors 55 and 59, and strips 65 and 71 are combined therewith in exactly the same manner as illustrated in FIG. 1A. This results in the formation of a composite web which is much the same as the composite web W2 appearing in FIG. 4 except that it lacks the web 9 and strips 17 and 19 are on instead of under web 25. This composite web is then fed downward under the same arcuate folding horn 75 and onto the upper horizontal reach 77 of belt conveyor 79, as before, and the composite web is folded to form continuous pad material M1 (see FIGS. 10A, 11A and 13) comprising the flat unfolded central layer of fluid-repellent tissue 65, a layer of absorbent tissue 71 surrounding the central fluid-repellent layer having bottom portion 71a underlying the central layer 65 and portions 71b folded around the side edges of the central layer 65 and overlying the top of central layer 65, fluff layer 29 surrounding the layer 71 having flat bottom portion 29a underlying bottom portion 71a of layer 71 and portions 29b folded around the side edges of the layer 71 and overlying the top of layer 71, side strips 17 and 19 overlying fluff layer 29 at the sides thereof, and layer 25 of absorbent tissue surrounding the fluff layer and the side strips having bottom portion 25a and portions 25b overlying the top of the fluff layer. The operations between FIG. 10 and FIG. 10A may be readily visualized simply by viewing FIGS. 1A and 2A and regarding the outer wrapper web 9 as being omitted and side strips 17 and 19 as on top of web 25.

The above-described pad material M1 feeds into the punch press P, the dies of which are changed to segment the pad material M1 into individual pads having arcuate ends 141 instead of button-headed ends, these arcuate ends being only slightly compressed to provide the usual end taper. For this purpose, the press is provided with a female die 143 having an hourglass-shaped opening 145 providing a forwardly extending rounded-end die portion 147 and a rearwardly extending rounded-end die portion 149 separated by a narrow neck portion 151 of opening 145. The plunger of the press carries a male die (not illustrated) having a shape corresponding to that of opening 145 adapted to cooperate shearwise with female die 143 to shear the pad material M1 which overlies the female die.

The pad material M1 is fed continuously through the press P and the press is intermittently operated at intervals corresponding to the desired pad length to segment the pad material into individual pads 153. These pads feed forward down the chute 120 and come onto the web 9e which is being fed forward from roll 7 on the upper reach of an endless belt conveyor 155. The speed of belt conveyor 155 in relation to the delivery of the pads is such that the pads become spaced along the length of web 9e at intervals corresponding to the desired length for the outer wrapper of the napkins (this length may be about eighteen inches, for example, the pads 153 being about seven inches long).

Figures 10, 12:
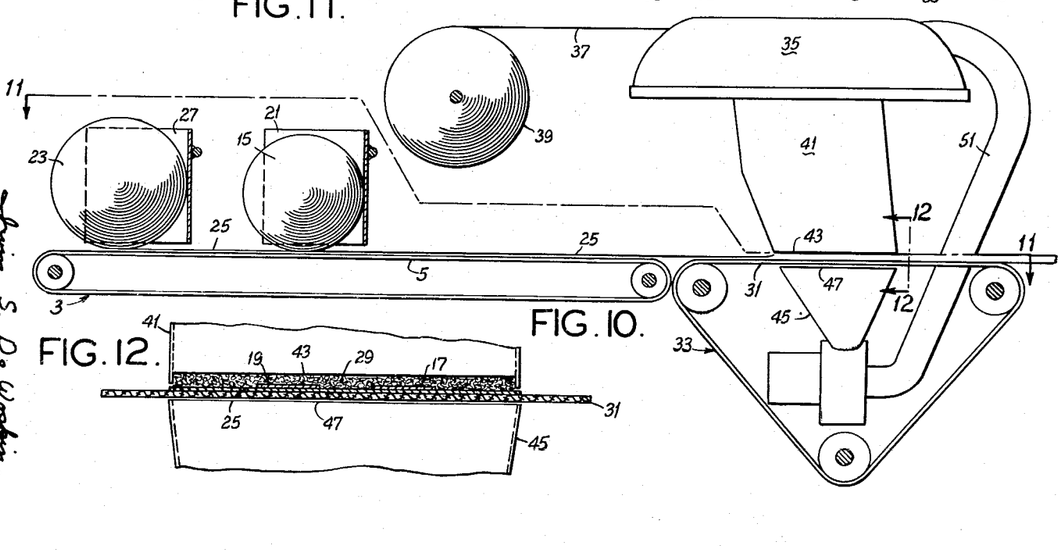
FIGS. 10, 10A, 10B and 10C are semidiagrammatic side elevations illustrating a method and apparatus of this invention for making napkins with outer wrapper extensions, FIG. 10 corresponding to FIG. 1 and FIG. 10A corresponding to part of FIG. 1B, FIG. 10B being a continuation of FIG. 10A, and FIG. 10C being a continuation of FIG. 10B.
FIG. 12 is an enlarged vertical transverse cross section taken on line 12—12 of FIG. 10 and corresponding to FIG. 3.
Figures 10A, 11A, 13:
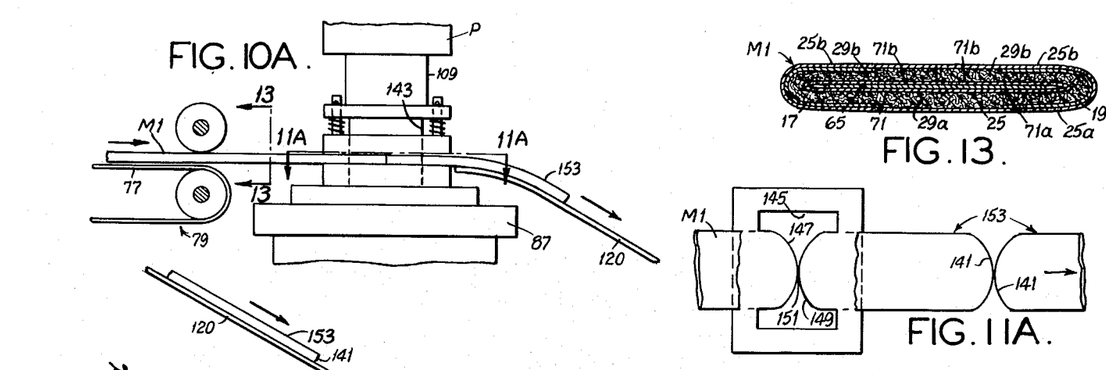
FIG. 11A is a view taken essentially on line 11A—11A of FIG. 10A, with parts broken away.
FIG. 13 is an enlarged vertical transverse section taken on line 13—13 of FIG. 10A.
Figure 10B:
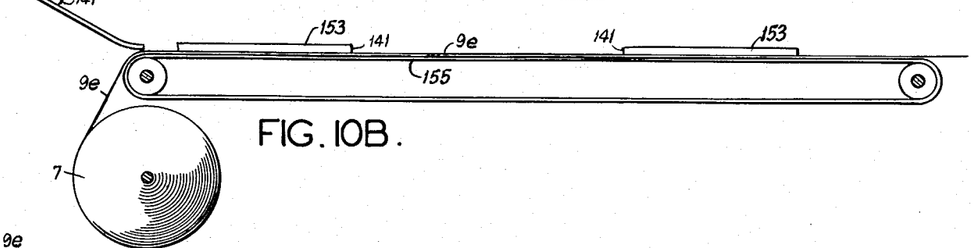
Figure 10C:
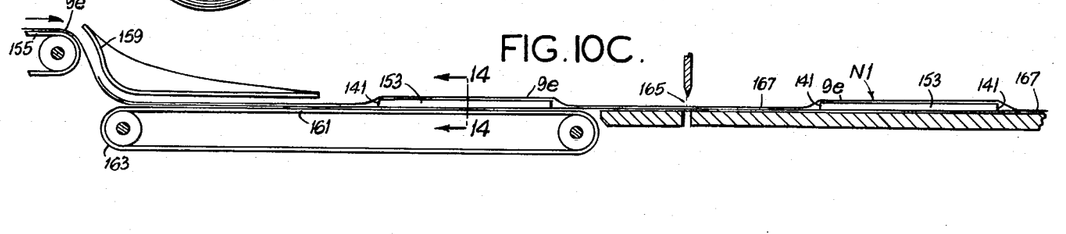
Figure 11:
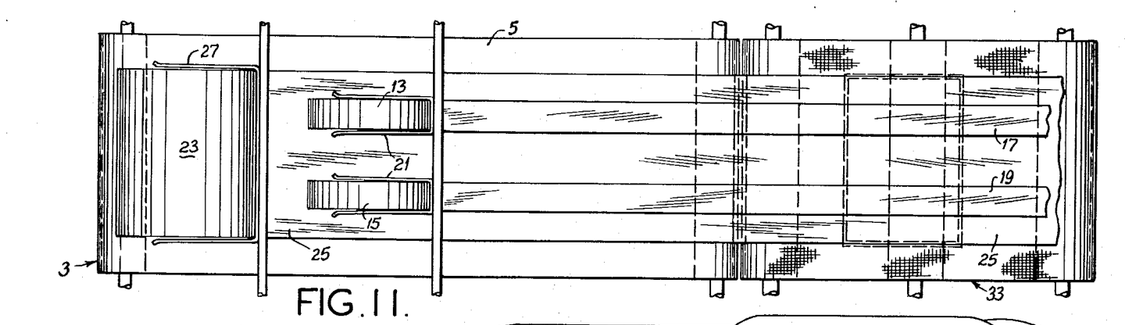
FIG. 11 is a plan view of FIG. 10, with certain parts omitted, taken essentially on line 11—11 of FIG. 10.

The web 9e with pads 153 spaced therealong feeds off the forward end of belt conveyor 157 and downward under an arcuate folding horn 159, which may be similar to the folding horn 75, and onto the upper horizontal reach 161 of an endless conveyor 163 (see FIG. 10C). As the web with the pads thereon travels forward under the horn, folding means (which may be similar to the previously mentioned folding means 83) acts to fold over the side portions of the web 9e on top of the pads. This in effect forms the web 9e into a tube with the pads within the tube spaced at intervals along its length. Finally, the tubed web 9e, now completely formed into the outer wrap for the pads, is segmented as indicated at 165 midway between the pads, thereby forming napkins N1 with the outer wrap extensions 167 such as shown in FIG. 15.

Figures 14, 15:
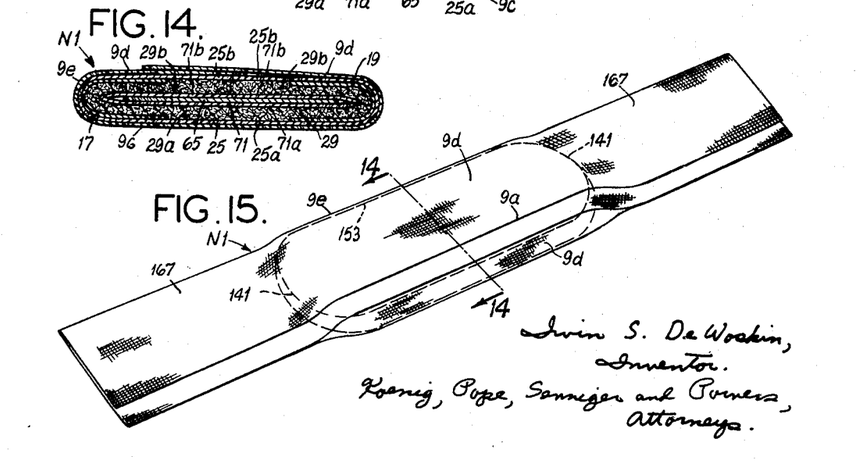
FIG. 14 is an enlarged vertical transverse section taken on line 14—14 of FIG. 10C.
FIG. 15 is a perspective of a completed napkin with outer wrapper extensions.

The napkins N1 are similar to the napkins N except that they have the outer wrap extensions 167 instead of the button-headed ends and with the difference in cross section as will appear from a comparison of FIG. 14 with FIG. 5 that the side strips 17 and 19 are inside instead of outside the inner wrap 25.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. In the manufacture of absorbent pads, the steps of feeding a continuous web of fluff and a strip of fluid-repellent material in a forward direction with the strip on one face of said web, said strip being narrower than said web and located between the side edges of said web, and, as said web and strip are fed forward, folding the side marginal portions of said web which lie outward of the side edges of said strip around the side edges of the strip to form continuous pad material having the strip as a central layer and a fluff body surrounding the strip, and, as said continuous pad material continues being fed forward, segmenting it into individual pads.

2. The method of making absorbent pads comprising the steps of continuously feeding a web of porous material in a forward direction, depositing fibers on said web to form a continuous layer of fluff thereon, applying a continuous strip of fluid-repellent material to the layer of fluff extending longitudinally thereof, said strip being narrower than the layer of fluff and said porous web and being located between the side edges thereof, and, as the combined web, fluff layer and strip are fed forward, folding the side marginal portions of the fluff layer and web which lie outward of the side edges of the strip around the side edges of the strip to form continuous pad material having the strip as a central layer, a fluff body surrounding the central layer, and a porous material layer surround the fluff body, and, as said continuous pad material continues being fed forward, segmenting it into individual pads.

3. The method of claim 2 wherein a continuous web of outer wrap material is combined with said web of porous material prior to the depostion of the fibers on said web of porous material, said outer wrap material being folded around with said web of porous material and said fluff layer.

4. The method of claim 3 wherein the segmenting of the continuous pad material involves die-cutting to form button-headed ends on each pad with compression of said button-headed ends.

5. The method of claim 4 with the further step of treating the compressed button-headed ends with a waterproofing and stiffening agent.

6. The method of claim 5 wherein said agent is applied in liquid form to said ends.

7. The method of claim 3 wherein continuous strips of fluid-repellent material are combined with the web of porous material and the web of outer wrap material prior to the deposition of the fibers on the web of porous material, these strips being positioned to extend along the sides of the fluff body in the said continuous pad material.

8. The method of claim 2 wherein the individual pads are delivered on to a continuously moving continuous web of outer wrap material to lie at spaced intervals along said web of outer wrap material, the latter being folded around said pads, and wherein the folded outer wrap material is cut between the pads.

9. The method of claim 8 wherein continuous strips of fluid-repellent material are combined with the web of porous material prior to the deposition of the fibers on the web of porous material, these strips being positioned to extend along the sides of the fluff body in the said continuous pad material.

10. Apparatus for manufacturing absorbent pads comprising means for feeding a continuous web of porous material from a supply thereof along a predetermined path, means for comminuting a web of fibrous material to provide loose fibers, means for conveying said fibers to said web as it travels along said path to form a layer of fluff thereon, means for combining a continuous strip of fluid-repellent material with the web and fluff layer on the fluff layer, said strip being narrower than the web and the fluff layer and being located between the side edges of the web and the fluff layer, means for folding the portions of the web and fluff layer which lie outward of the side edges of strip around the side edges of said strip, and means for segmenting the resultant material into individual pads.

11. Apparatus as set forth in claim 10 wherein said fiber conveying means comprises a first duct extending from said comminuting means and having an open end over said path, a second duct having an open end under said path registering with the open end of said first duct, said second duct being connected to the inlet of a blower, and the outlet of the blower being connected to said comminuting means.

12. Apparatus as set forth in claim 11 further comprising an endless screen feed belt for said web having a reach travelling between said open ends of said ducts.

13. Apparatus as set forth in claim 10 wherein said folding means includes an arcuate folding horn around which said web, fluff layer and strip are fed.

14. Apparatus as set forth in claim 10 further comprising means for combining a pair of side strips of fluid-repellent material with said web prior to the formation of the fluff layer thereon.

15. Apparatus for manufacturing absorbent pads comprising means for feeding a continuous web of porous outer wrap material along a predetermined path, means for combining a continuous web of porous inner wrap material with the web of outer wrap material and overlying the latter, the web of inner wrap material being narrower than the web of outer wrap material and the latter having side marginal portions outward of the side edges of the web of inner wrap material, means for comminuting a web of fibrous material to provide loose fibers, suction means for depositing said fibers on said web of inner wrap material as the webs travel along said path to form a layer of fluff on said web of inner wrap material, means for combining a continuous strip of fluid-repellent material with said webs and said fluff layer overlying said fluff layer, said strip being narrower than said fluff layer and being located between the side edges of the web of inner wrap material and the fluff layer, means for folding the portions of the webs and the fluff layer which lie outward of the side edges of said strip around the side edges of said strip, and means for segmenting the resultant material into individual pads with button-headed ends and compressing said ends.

16. Apparatus as set forth in claim 15 further comprising means for conveying said pads away from said segmenting means, and means for applying a waterproofing and stiffening agent to the pad ends as the pads are conveyed away by said conveying means.

17. Apparatus as set forth in claim 16 wherein said conveying means comprises an endless belt having a width less than the length of said pads and extending transverse to said predetermined path of feed, said pads being conveyed by the belt with their ends extending beyond the sides of the belt, and said agent-applying means comprising a pair of nozzles located at opposite sides of the belt and means for delivering said agent in liquid form to said nozzles.

18. Apparatus as set forth in claim 14 further comprising means for combining a pair of side strips of fluid-repellent material with said webs prior to the deposition of the fibers.

19. Apparatus for manufacturing absorbent pads comprising means for feeding a continuous web of porous inner wrap material along a predetermined path, means for comminuting a web of fibrous material to provide loose fibers, suction means for depositing said fibers on said web as the web travels along said path to form a layer of fluff thereon, means for combining a continuous strip of fluid-repellent material with the web and fluff layer overlying the fluff layer, said strip being narrower than said fluff layer and being located between the side edges of the web and fluff layer, means for folding the portions of the web and fluff layer which lie outward of the side edges of said strip around the side edges of said strip, means for segmenting the resultant material into individual pads, means for feeding a continuous web of outer wrap material in line with said path, said pads being delivered on to said web of outer wrap material to lie as spaced intervals therealong, and means for folding the web of outer wrap material into a tube around the pads, said tube being adapted to be segmented between the pads.

20. Apparatus as set forth in claim 19 further comprising means for combining a pair of said strips of fluid-repellent material with said web of inner wrap material prior to the deposition of the fibers.

References Cited by the Examiner
UNITED STATES PATENTS

| | | | |
|---|---|---|---|
| 1,203,762 | 11/16 | Mastin | 156—201 |
| 2,086,757 | 7/37 | William | 156—201 |
| 2,283,137 | 5/42 | Fine | 156—202 |
| 2,322,692 | 6/43 | Hunt | 156—202 |

EARL M. BERGERT, *Primary Examiner.*

DOUGLAS J. DRUMMOND, *Examiner.*